No. 629,236. Patented July 18, 1899.
J. CARR.
TOOL HOLDER FOR METAL WORKING MACHINES.
(Application filed Mar. 17, 1899.)
(No Model.)
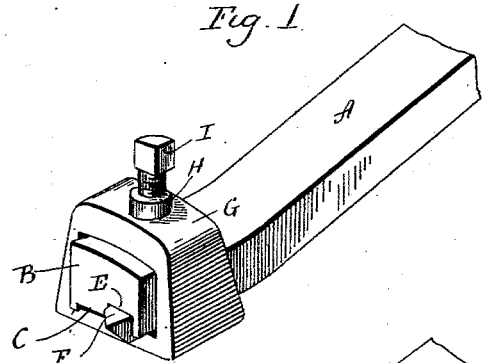
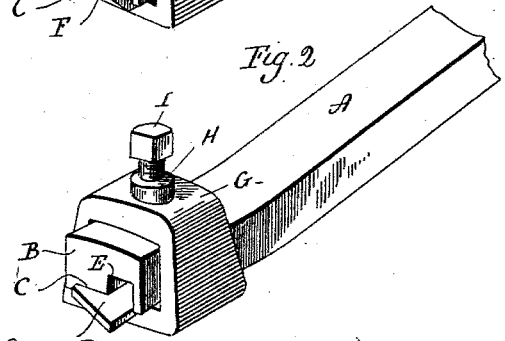
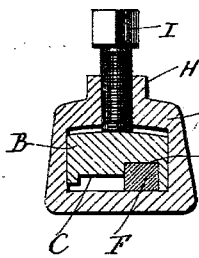 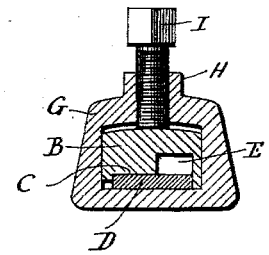 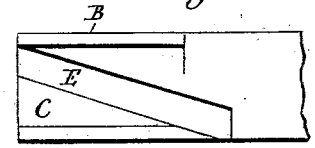
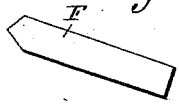
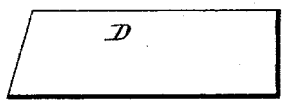

UNITED STATES PATENT OFFICE.

JAMES CARR, OF NEW HAVEN, CONNECTICUT, ASSIGNOR TO THE HOGGSON & PETTIS MANUFACTURING COMPANY, OF SAME PLACE.

TOOL-HOLDER FOR METAL-WORKING MACHINES.

SPECIFICATION forming part of Letters Patent No. 629,236, dated July 18, 1899.

Application filed March 17, 1899. Serial No. 709,428. (No model.)

*To all whom it may concern:*

Be it known that I, JAMES CARR, of New Haven, in the county of New Haven and State of Connecticut, have invented a new Improvement in Tool-Holders for Metal-Working Machines; and I do hereby declare the following, when taken in connection with the accompanying drawings and the letters of reference marked thereon, to be a full, clear, and exact description of the same, and which said drawing constitute part of this specification, and represent, in—

Figure 1, a perspective view of a tool-holder embodying my invention and represented as containing a lathe or planing-tool; Fig. 2, a similar view representing the holder as containing a threading or cutting-off tool; Fig. 3, a transverse sectional view through the center of the yoke shown in Fig. 1; Fig. 4, a similar sectional view of Fig. 2; Fig. 5, a plan view of the grooved face of the tool-holding shank; Fig. 6, a side view of the lathe or planing-tool; Fig. 7, a side view of the threading or cutting-off tool.

This invention relates to an improvement in tool-holders for metal-working machines, and particularly to that class which comprise a shank having a groove or passage in one side or through it for the reception of a cutting-tool, the object of the invention being to produce a simple construction and arrangement whereby the same holder is adapted to receive and rigidly hold tools differentiated in size; and it consists in the construction and combination of parts, as will be hereinafter described, and particularly recited in the claim.

As usual in holders of this class my invention consists of a shank A, formed from a rectangular strip of steel and preferably having its outer end B slightly offset, although this is not necessary or in some cases even desirable. In one face of the outer end is a wide shallow groove C, slightly less in depth than the thickness of a cutting-off or threading tool D, which is usually constructed, as shown in Figs. 2, 4, and 7, from a comparatively flat piece of steel properly shaped at its outer end to provide a cutting edge. The outer end of the shank is also formed with a narrow deep diagonal groove E, opening into the groove C and adapted to receive a lathe or planing-tool F, which when in position will extend slightly below the face of the holder, as shown in Figs. 1 and 3. Preferably and as herein shown the upper face of the shank is slightly rounded, although this is not necessary and forms no part of this invention.

In order to hold the tools in position, I employ a yoke G, corresponding to and slightly larger than the shank and so as to set over the outer end thereof. This yoke is formed with a boss H at its top, extending through which and the top of the yoke is a threaded opening for the reception of a set-screw I and so that when in position and a cutter in one of the grooves the screw may be turned inward, so as to clamp the yoke against the side of the cutter projecting beyond the face of the shank and so as to clamp the cutter in the holder. With a device of this character it is only necessary to loosen the screw I in order to adjust the cutters or to remove one and substitute the other and so that the tools may be removed, adjusted, or exchanged without taking the holder out of the machine. Furthermore, the cutters are so tightly clamped in the holder and held so near the outer end thereof that the cutters may be used when quite short, so that the life of a cutter is materially extended.

While the groove E is inclined in one direction, it is apparent that it might be inclined in either, according to the position which the tool is to occupy. Therefore I do not wish to be understood as limiting my invention to the exact construction shown.

I am aware that tool-holders have been constructed with two or more differentiated tool-receiving grooves, and I am also aware that a clamping-yoke has been employed around the end of the tool-holder as a means for clamping the tool in position, and therefore do not wish to be understood as claiming, broadly, such as my invention.

Having described my invention, what I claim as new, and desire to secure by Letters Patent, is—

A tool-holder having a wide shallow tool-receiving groove, and a deep narrow tool-receiving groove, both arranged in one face of its shank and opening into each other, a yoke surrounding the grooved end of the shank, and provided with a set-screw whereby the yoke is clamped against a cutter placed in one of the grooves, substantially as described.

In testimony whereof I have signed this specification in the presence of two subscribing witnesses.

JAS. CARR.

Witnesses:
 HARRY B. KENNEDY,
 J. M. COLGAN.